United States Patent
Sommer et al.

(10) Patent No.: US 6,297,785 B1
(45) Date of Patent: Oct. 2, 2001

(54) OPERATION OF A PLURALITY OF VISUAL DISPLAY UNITS FROM ONE SCREEN CONTROLLER

(75) Inventors: Heinz Sommer; Dominik Widmaier, both of Berlin (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/142,999
(22) PCT Filed: Mar. 3, 1997
(86) PCT No.: PCT/DE97/00390
  § 371 Date: Sep. 14, 1998
  § 102(e) Date: Sep. 14, 1998
(87) PCT Pub. No.: WO97/34220
  PCT Pub. Date: Sep. 18, 1997

(30) Foreign Application Priority Data

Mar. 12, 1996 (DE) ................................. 196 09 667

(51) Int. Cl.[7] ........................................ G09G 5/00
(52) U.S. Cl. .................................. 345/1; 345/3; 345/98
(58) Field of Search .......................... 345/1, 2, 3, 4, 345/11, 98

(56) References Cited

U.S. PATENT DOCUMENTS 4,926,166 * 5/1990 Fujisawa et al. ................. 345/3
4,965,559 10/1990 Dye .
5,488,385 1/1996 Singhal et al. .

FOREIGN PATENT DOCUMENTS

| 37 17 787 A1 | 1/1988 | (DE) . |
| 44 04 104 A1 | 8/1994 | (DE) . |
| 0 195 203 | 9/1986 | (EP) . |
| 0 701 199 A2 | 3/1996 | (EP) . |

OTHER PUBLICATIONS

IBM Technical Disclosure Bulletin, "Controller Attachment to Space and Time Separated Displays", vol. 18, No. 6, Nov. 1975, pp. 1955–1957.

Japanese Abstract, 06006724, Jan. 14, 1994.

* cited by examiner

Primary Examiner—Steven Saras
Assistant Examiner—Alecia Nelson
(74) Attorney, Agent, or Firm—Schiff Hardin & Waite

(57) ABSTRACT

Method and circuit arrangement for independent operation of a plurality of visual display units (210–216) from one screen control unit (10), which can emit clock signals and a number of character-related or pixel-related video data signals corresponding to the line and column resolution of a two-dimensional rectangular raster image which is to be displayed on a visual display unit. Rectangular subareas of a full screen format are in this case displayed on one of the visual display units (210–216).

5 Claims, 2 Drawing Sheets

OPERATION OF A PLURALITY OF VISUAL DISPLAY UNITS FROM ONE SCREEN CONTROLLER

BACKGROUND OF THE INVENTION

1. Field of the Invention

Figure 1:
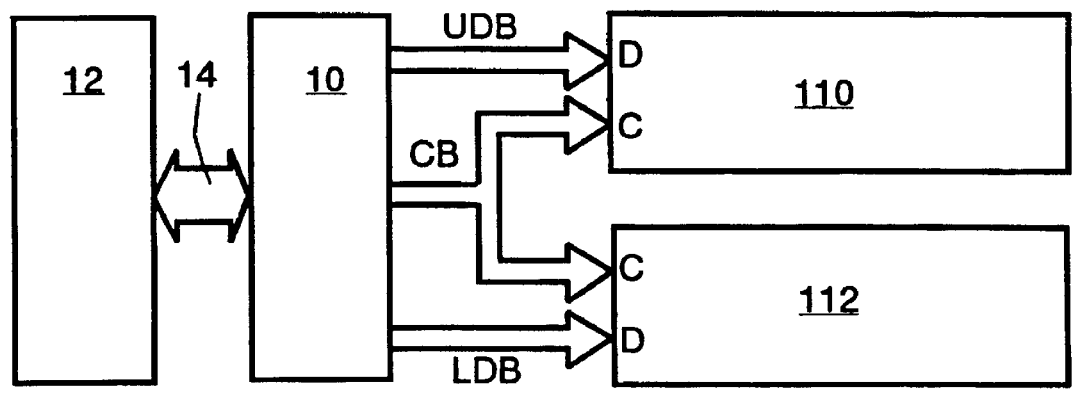

The present invention relates to a method and a circuit arrangement for independent operation of a plurality of visual display units from one screen control unit.

2. Description of the Related Art

In equipment whose control system is based on PC (person computer) technology, a visual display unit is in general operated from a monitor interface which operates, for example, on the VGA Standard and is provided by a special screen control unit which in the example is a so-called VGA controller. The PC software operating system includes an appropriate driver program. If the intention is to connect a plurality of visual display units which are intended to indicate different information at the same time, a dedicated screen control unit is required for each visual display unit.

A plurality of visual display units are in general required wherever a number of people are monitoring data acquisition or processing processes or where different people are each intended to have access to only a part of the overall information. This is the situation, for example, with cash registers or with service terminals which are equipped at least with an operator display and a customer display. In addition, an animation screen is frequently provided for displaying advertising or general information, or else a numerical display device for displaying the reservation number of a next customers To provide a screen control unit for each display unit consumes space and is expensive, as well as having a disadvantageous effect on the processing speed of the PC.

In U.S. Pat. No. 4 965 559, it has therefore been proposed for a plurality of visual display units to be operated from one screen control unit, which emits clock signals and a number of character-related or pixel-related video data signals corresponding to the line and column resolution of a two-dimensional rectangular raster image. In this case, the clock and video data signals which belong to rectangular subareas of the raster image are in each case supplied to a visual display unit. However, in addition, an individual assignment or matching device (look-up table) is required for each visual display unit.

SUMMARY OF THE INVENTION

An object of the present invention is to provide a method and a circuit arrangement which allow the independent operation of a plurality of visual display units from one screen control unit.

The invention provides a method.

The invention uses a screen control unit which can emit clock signals and a number of character-related or pixel-related video data signals corresponding to the line and column resolution of a two-dimensional rectangular raster image which is to be displayed on a visual display unit. One such control unit is, for example, a VGA controller which is known from the PC (person computer) world and whose resolution can be changed between different formats. One frequently used format has a resolution of 640 pixels horizontally and 480 pixels vertically in the graphics mode, and 80 characters/line and 30 lines in the character mode, one character being allocated an area of 8×16 pixels. The format is related to a so-called full screen, as is known from CRT visual display units. The individual pixels and the characters are represented by video data signals. In order to simplify the presentation of the invention, the following description is always based on a full format of 640×480 pixels, corresponding to 30×80 characters. However, the invention can also be applied to any other format.

In addition to full screens, visual display units are also known which have a reduced picture field, for example 320×240, 240×64 or 120×64 pixels, corresponding to 15 lines×40 characters, 4×30 or 4×x15 characters. If the video data signals and the clock signals which transfer them for rectangular sub-areas in the raster frame are supplied to in each case one visual display unit, then a plurality of visual display units can be operated from a single screen control unit.

These visual display units can be arranged physically and separately from one another, for example one on the cashier's side and a second on the customer's side of a cash register, a third in a so-called till indicator above a till workstation, and a fourth anywhere on the sales floor of a large shop.

If it is intended to operate the individual visual display units entirely independently of one another in terms of the information to be displayed, the sum of the characters and pixels which can be displayed on all the visual display units must be less than or equal to the number of data signals emitted by the screen control unit.

However, it is also frequently desirable to display at least parts of the information on a number of visual display units. For example, a screen line which includes the date and time could be displayed on the customer's display and the operator's display. To do this, the video data and clock signals which represent this screen line must be supplied to both visual display units. In this case, the sum of the characters and pixels which are to be displayed on all the visual display units may be greater than the number of data signals emitted by the screen control unit.

Figure 3:
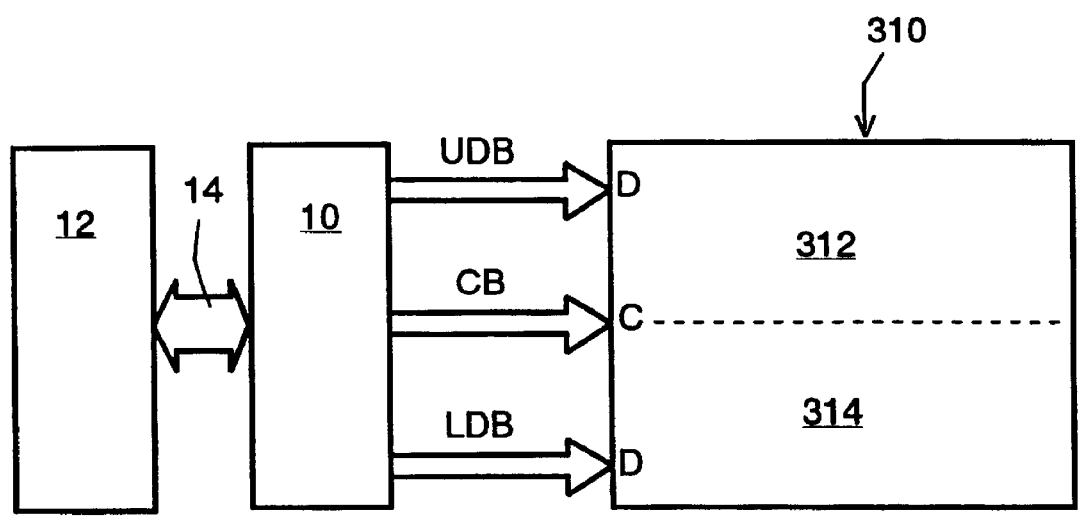
Figure 2:
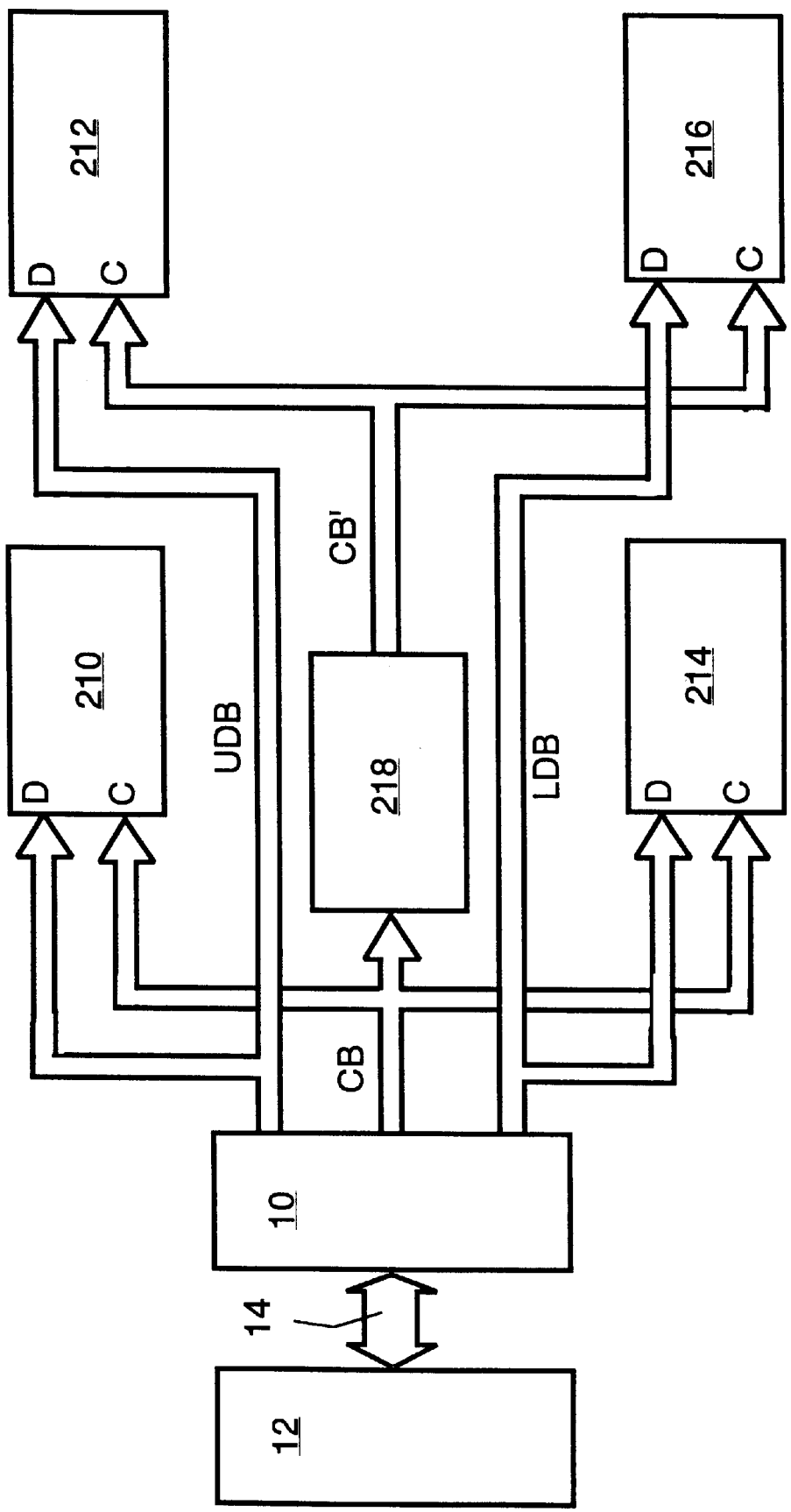

Further features and advantages of the invention result from the following description, which explains the invention with reference to a plurality of exemplary embodiments and in conjunction with the attached drawings, in which:

FIG. 1 is a block diagram which shows a circuit arrangement having two visual display units, FIG. 2 is a block diagram which shows a circuit arrangement having four visual display units, and FIG. 3 is a block diagram which shows a circuit arrangement having a dual scan visual display unit according to the prior art.

DETAILED DESCRIPTION OF THE PREFERRED EMBODIMENTS

FIG. 3 shows a block diagram of a known circuit arrangement having a full LCD screen 310 with 640×480 pixels (corresponding to 30×80 characters), which is designed using DSTN (Dual Scan Super Twisted Nematic) technology. As is characteristic of dual scan LCD visual display units, the visual display unit 310 is split into an upper region 312 and a lower region 314. The upper region 312 is connected to a visual display unit control unit 10 via an upper data bus UDB, and the lower region 314 is connected to a visual display unit control unit 10 via a lower data bus LDB—the visual display unit control unit 10 being a so-called VGA controller. As a further connection between the visual display unit 310 and the VGA controller 10, a control bus CB is provided which is allocated to both screen regions 312 and 314 and on which the clock and control signals are carried which are necessary for dual scan LCD visual display units and are known per se. For its part, the VGA controller 10 is driven via a further bus 14, from the arithmetic unit 12 of a PC, which is otherwise not illustrated. The essential part of a VGA controller of this said type is, for example, the component No. 65535 "Flat Panel/CRT VGA Controller", from the company Chips and Technologies, Inc., to which only a VGA BIOS and a video replay memory now need be connected.

The present invention makes use of the characteristics of a "Flat Panel/CRT VGA Controller" of this said type. In this case, parts which occur more than once are given the same reference characters in the following text.

FIG. 1 shows a block diagram of the connection of two LCD visual display units 110 and 112, which operate using a single scan method that is known per se, to a VGA controller 10 which is set up for the dual scan mode. The data input D of one visual display unit 110 is connected via the upper data bus UDB to the VGA controller 10, and the data input D of the other visual display unit 112 is connected via the lower data bus LDB to the VGA controller 10. The control bus CB is connected in parallel to the clock signal input C of the two visual display units 110 and 112. The connection of the VGA controller 10 to an arithmetic unit 12 via a bus 14 is made in a corresponding manner to the prior art illustrated in FIG. 3.

In the case of mutually independent operation, the visual display units 110 and 112 may have a maximum format of 320×480 pixels, corresponding to 15×x80 characters. In the text mode, the first fifteen lines of a frame are displayed on the visual display unit 110 which is connected to the upper data bus UDB, and the second fifteen lines of a frame are displayed on the visual display unit 112 which is connected to the lower data bus LDB. A corresponding situation applies to the graphics mode. However, commercially available smaller formats with, for example, 320×240 pixels, corresponding to 15 lines of 40 characters each, can also be connected, although they then only partially utilize the display capacity of the full format.

FIG. 2 shows a block diagram of the connection of four LCD visual display units 210, 212, 214 and 216, which are operated using the single scan method, to a VGA controller 10 which is set up for the dual scan mode. The data inputs D of the visual display units 210 and 212 are connected via the upper data bus UDB to the VGA controller 10, and the data inputs D of the visual display units 214 and 216 are connected via the lower data bus LDB to the VGA controller 10. The clock signal inputs C of the visual display units 210 and 214 are connected directly to the control bus CB, while the clock signal inputs C of the visual display units 212 and 216 are connected to a control bus CB', upstream of which a gate circuit 218 having a counter is connected. This gate circuit 218 suppresses the clock signals for video information items which are displayed on the directly driven visual display units 210 and 214.

In the case of mutually independent operation, the visual display units 210–216 may have a maximum format of 320×240 pixels, corresponding to 15×40 characters. In the text mode, positions 1–40 of lines 1–15 of a frame are displayed on the first visual display unit 210, positions 41–80 of lines 1–15 are displayed on the visual display unit 212, positions 1–40 of lines 16–30 are displayed on visual display unit 214, and positions 41–80 of lines 16–30 are displayed on visual display unit 216. The visual display unit 210 thus forms the left-hand upper quarter of a frame, the visual display unit 212 forms the right-hand upper quarter, the visual display unit 214 forms the left-hand lower quarter, and the screen 216 forms the right-hand lower quarter. A corresponding situation applies to the graphics mode. Visual display units with a smaller format may also be connected. The display capacity of the full format is then only partially utilized.

If the left-hand visual display units 210 and 214 have a different number of character positions, a dedicated gate circuit must be assigned to each right-hand visual display unit, or a gate circuit having a plurality of outputs is used, which emit clock signals after the respectively required number of steps.

The VGA controller 10 is once again connected via a bus 14 to an arithmetic unit 12 in a corresponding manner to the prior art illustrated in FIG. 3.

The exemplary embodiments which have been explained with reference to FIGS. 1 and 2 can also be combined with one another, for example, a visual display unit having 15×80 characters, corresponding to 320×480 pixels, can be connected to the upper data bus UDB, and two visual display units having 15×40 characters, corresponding to 320×240 pixels each, can be connected to the lower data bus LDB. In the text mode, positions 1–80 of lines 1–15 of a frame are then displayed on the upper visual display unit, and positions 1–40 or 41–80 of lines 16–30 are displayed on the lower visual display units.

In all the examples, the visual display units may also have a larger format. The information intended for one screen then occupies only a portion of the screen area, while information which is also displayed on an adjacent visual display unit appears on the remaining area. This can be utilized in a simple manner for simultaneously displaying information on a number of visual display units. If this is not desired, it is necessary to suppress the relaying of the video data and clock signals relating to the last-mentioned information items.

The operation of a number of visual display units in the indicated manner from a single screen control unit 10 has the advantage that, instead of these visual display units, a single full screen may also be connected without the display programs having to be changed. When user programs are being created and tested, the contents of the visual display units 110, 112 and 210–216 are displayed to the programmer as subareas on a single visual display unit. It is also possible to create and to test such programs on a PC with standard equipment, without the various visual display units having to be available. Similar advantages also result during the installation and maintenance of an installation whose visual display units under some circumstances are spread over a large area and therefore cannot be seen at a glance.

Although other modifications and changes may be suggested by those skilled in the art, it is the intention of the inventor to embody within the patent warranted hereon all changes and modifications as reasonably and properly come within the scope of their contribution to the art.

What is claimed is:

1. A method for independent operation of a plurality of visual display units from one screen control unit, comprising the steps of:
   emitting clock signals and a number of character-related or pixel-related video data signals corresponding to line and column resolution of a two-dimensional rectangular raster image which is to be displayed on a full screen, supplying the clock and video data signals associated with rectangular subareas of the two-dimensional rectangular raster image to each visual display unit, and a sum of character areas or pixels which can be driven separately on all the visual display units being less than or equal to a number of clock and video data signals which are emitted by the screen control unit operating the visual display units in the single scan mode from a screen control unit which is set to dual scan mode.

2. The method as claimed in claim 1, wherein a sum of the characters and pixels which can be displayed on all the visual display units is greater than a number of video data signals which are emitted by the screen control unit, and further comprising:

supplying at least one of clock and video data signals to at least a part of a subarea of more than one visual display unit.

3. A circuit arrangement for for independent operation of two visual display units which are operated in the single scan mode, and which each have a data input and a clock signal input and one of which is intended for displaying an upper subarea of a frame, and the other of which is intended for displaying a lower subarea of a frame, comprising:

screen control unit which is set up for dual scan mode and has an upper data bus and a lower data bus and a control bus, and the clock signal inputs of both of said visual display units being connected in parallel to the control bus of the screen control unit, the data input of one of said two visual display units being connected to the upper data bus, and the data input of an other of said two visual display units being connected to the lower data bus of the screen control unit.

4. A circuit arrangement for independent operation of two visual display units which are operated in the single scan mode and have a data input and a clock signal input, and one of which is intended for displaying a left-hand subarea of a frame and an other of which is intended for displaying a right-hand subarea of a frame, comprising:

screen control unit which is set up for dual scan mode and has an upper data bus and a lower data bus and a control bus, the clock signal input of a first of said two visual display units which is displaying one subarea being connected directly to said control bus of the screen control unit, a counting gate circuit, the clock signal input of a second of said two visual display units which is displaying an other subarea being connected via said counting gate circuit to the control bus of the screen control unit, and the data inputs of the two visual display units being connected in parallel to said upper and lower data buss of the screen control unit.

5. A method as claimed in claim 1, wherein said dual scan mode is a VGA dual scan mode of a VGA controller.

* * * * *